11/3/87 XR 4,704,634

United States Patent [19]

Kato et al.

[11] Patent Number: 4,704,634

[45] Date of Patent: Nov. 3, 1987

[54] STREAK TUBE HAVING IMAGE SLITTING MEANS FOR TRANSMITTING SLIT ELECTRON IMAGES OF AN OBJECT

[75] Inventors: Makoto Kato; Yoshihiro Takiguchi; Katsuyuki Kinoshita, all of Shizuoka, Japan

[73] Assignee: Hamamatsu Photonics Kabushiki Kaisha, Shizuoka, Japan

[21] Appl. No.: 851,966

[22] Filed: Apr. 14, 1986

[30] Foreign Application Priority Data

Apr. 16, 1985 [JP] Japan .................................. 60-80944

[51] Int. Cl.[4] ............................................. H04N 5/228

[52] U.S. Cl. ..................................... 358/217; 358/218

[58] Field of Search ........................ 358/217, 218, 209; 250/213 VT

[56] References Cited

U.S. PATENT DOCUMENTS 4,120,002 10/1978 Lieber ................................ 358/209
4,243,878 1/1981 Kalibjian ...................... 250/213 VT
4,266,247 5/1981 Sutphin et al. ...................... 358/217
4,310,857 1/1982 Lieber et al. ......................... 358/217
4,611,920 9/1986 Tsuchiya ...................... 250/213 VT

FOREIGN PATENT DOCUMENTS 57-147020 9/1982 Japan .
2094545A 9/1982 United Kingdom .

*Primary Examiner*—Gene Z. Rubinson
*Assistant Examiner*—Stephen Brinich
*Attorney, Agent, or Firm*—Finnegan, Henderson Farabow, Garrett and Dunner

[57] ABSTRACT

A streak tube device for electrically slitting the image of an object provided by an optical system. The streak tube device includes a streak tube body having a photoelectric conversion device for receiving the object image and producing a corresponding electron image. The streak tube device further includes focusing apparatus for focusing the electron image, electrical slitting apparatus for transmitting a selected portion, that is, slit images of the electron image, apparatus for controlling the electrical slitting apparatus, and focusing apparatus for focusing slit images on a fluorescent surface included within the streak tube body. The electrical slitting apparatus of the streak tube device includes a slit member having a slit which extends across the streak tube body, shift electrodes for vertically shifting the transmitted electron image, and a circular collimator for collimating the shifted electron image and transmitting the collimated electron image through the slit to form a slit image.

4 Claims, 13 Drawing Figures

STREAK TUBE HAVING IMAGE SLITTING MEANS FOR TRANSMITTING SLIT ELECTRON IMAGES OF AN OBJECT

FIELD OF THE INVENTION

This invention relates to a streak tube that is utilized for ultra-high-speed photometric operations and two-dimensional ultra-high-speed photometric operations.

BACKGROUND OF THE INVENTION

A planar image to be measured is not always uniform. Therefore, it is sometimes necessary to measure the image part by part. This requirement may be satisfied by the provision of a device that uses a conventional streak tube as shown in FIG. 7.

Light from an object 1 is applied through an optical system 202 to a slit 203 so that an image is formed thereon. As a result, the part of the image defined by the slit is obtained. The slit-shaped image part is applied through a relay lens 204 to a conventional streak tube 200.

The slit-shaped optical image is subjected to photoelectric conversion by a photocathode 211, accelerated by a mesh electrode 212, focused by focusing electrodes 213, passed through an aperture 214, and applied to a fluorescent surface 216 through deflecting electrodes 215.

When the linear electron image passes through the deflecting electrodes 215, a ramp voltage is applied across the deflecting electrodes 215. The slit-shaped electron image is streaked by the electric field formed by the ramp voltage to obtain a streak image on the fluorescent surface 216. The streak image is recorded through a lens 207 by a television camera 208.

After the streak image has been taken by the television camera, the slit 203 is vertically moved to the next position by a slit moving means 205, and the above-described series of operations is carried out again. By performing the above-described series of operations in synchronization with the light emission of the object, streak images of the original image can be obtained one after another.

In the above-described device shown in FIG. 7, the mechanical slit is moved to obtain a part of the original image; in other words, whenever it is required to obtain a different part of the original image, it is necessary to move the slit. Therefore, it takes a relatively long period of time to obtain all of the streak images.

OBJECTS AND SUMMARY OF THE INVENTION

An object of the present invention is a streak tube incorporating an image slitting device that electrically performs image slitting operations.

Another object of the present invention is a streak tube for generating accurate images of a large surface.

A further object of the present invention is the generation of clear streak images.

These and other objects are achieved by a streak tube device for slitting the image of an object which is provided by an optical system, the device comprising a streak tube body having a first end and a second end, photoelectric conversion means at the first end for receiving the image of the object and producing a corresponding electron image, a fluorescent surface at the second end, a first focusing means for producing a first focused image of the electron image, electrical slitting means for transmitting a slit image corresponding to only a selected portion of the first focused image, slitting control means for electrically controlling the selection of the portion of the first focused image to the transmitted as the slit image such that the entire electron image is transmitted by a plurality of successive slit images, and second focusing means for focusing the slit images on selected locations of the fluorescent surface.

BRIEF DESCRIPTION OF THE DRAWINGS

The manner by which the above objects and other objects, features, and advantages of the present invention are attained will become fully apparent from the following detailed description when it is considered in view of the drawings, wherein.

DETAILED DESCRIPTION

This invention will be described with reference to the accompanying drawings in detail.

Figure 1:
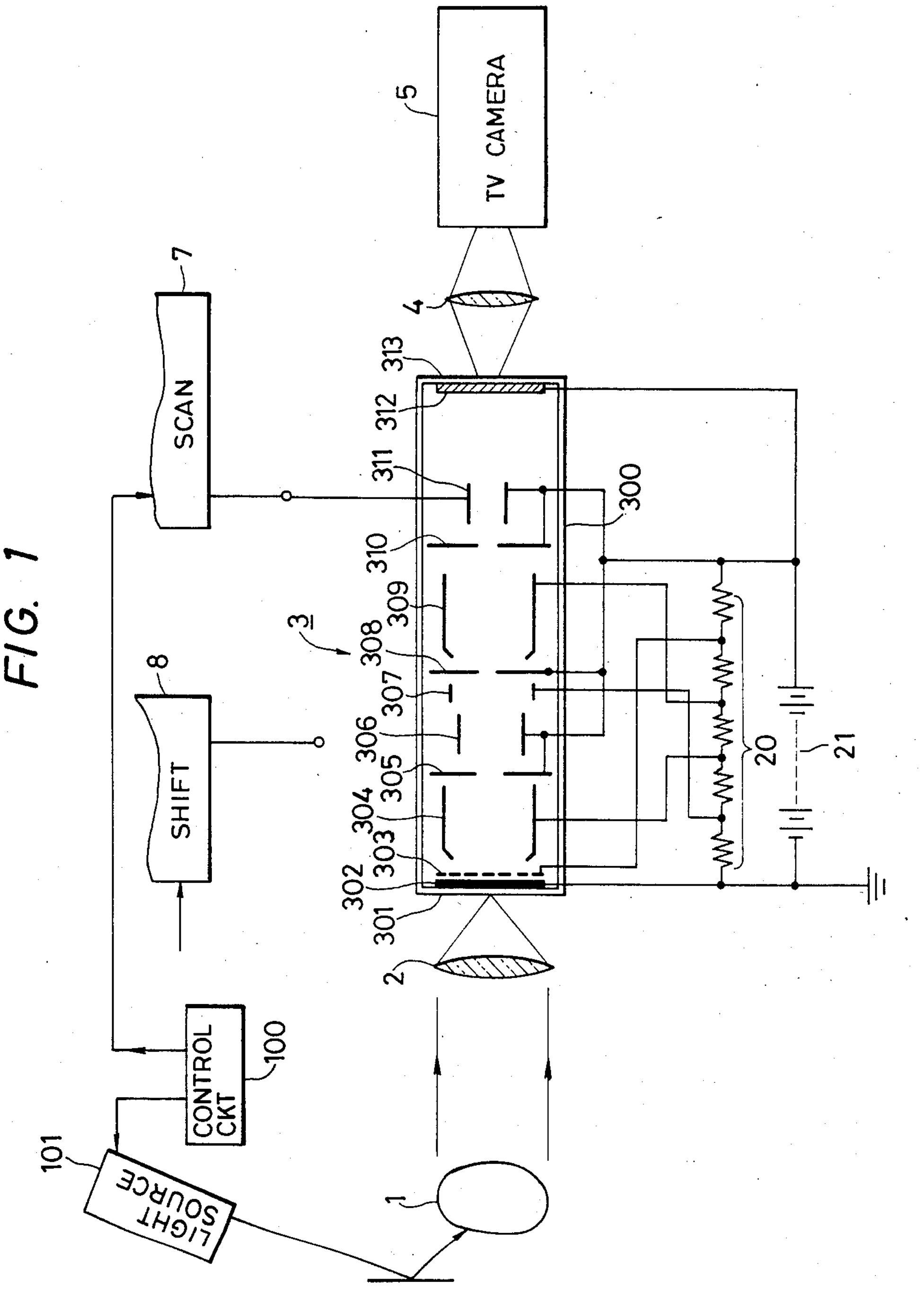
FIG. 1 is a sectional view of an embodiment of the streak tube device of the present invention.
Figure 2:
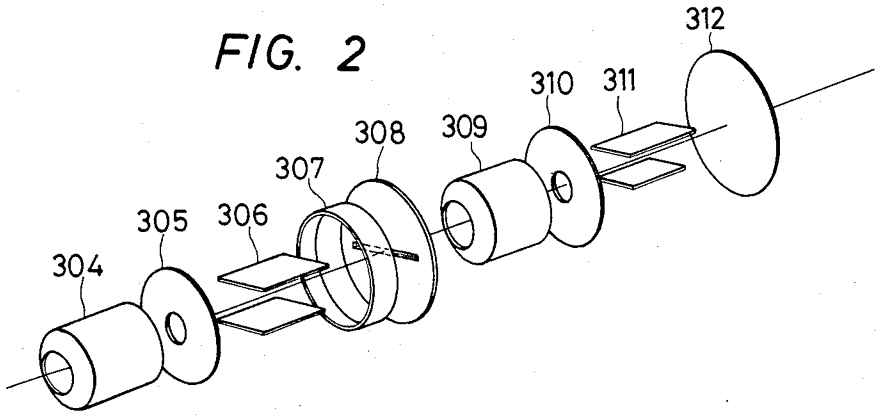
FIG. 2 is an exploded, perspective view of the streak tube device of FIG. 1.
Figure 3A:
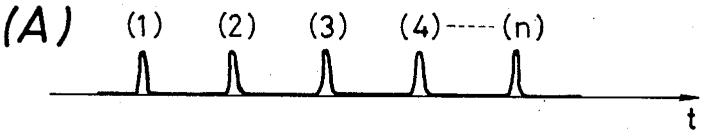
FIGS. 3A-3E are a waveform diagram for description of the operation of the streak tube device of FIG. 1.
Figure 3B:
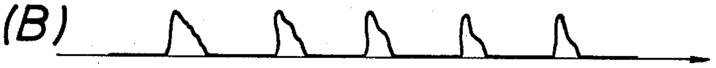
Figure 3C:
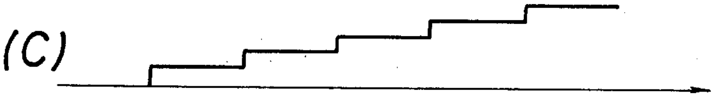
Figure 3D:
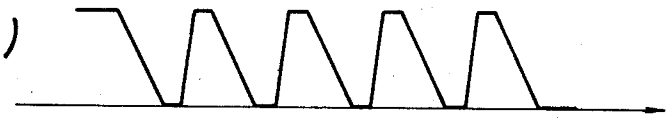
Figure 3E:
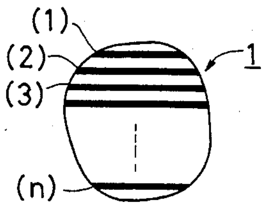

FIG. 1 is a sectional view showing one example of a streak tube according to the present invention, and FIG. 2 is an exploded view of the streak tube.

As shown in FIGS. 1 and 2, a photocathode 302 is formed on the inner wall of an incident window 301 that is the front end of a vacuum gas-tight container 300 of the streak tube.

An electron image comprising photoelectrons emitted from the photocathode 302 is accelerated by a mesh electrode 303, focused by a front stage focus electrode 304, and sent through a front stage aperture 305 into the space between a pair of shift electrodes 306. The mesh electrode 303, electrode 304, and aperture 305 comprise a first focusing means for producing a first focused image.

A shift voltage (described later) produced by a shift voltage generator 8' is applied to the shift electrodes 306 to shift upwardly or downwardly the electron image that has been focused by the focus electrode 304 and has passed through the front stage aperture 305.

The electron image thus shifted is moved in parallel with the axis of the tube by a collimator electrode 307 and applied to a slit 308. Together the shift electrodes 306, collimator electrode 307, and slit 308 comprise electrical slitting means for transmitting a slit image corresponding to only a selected portion of the first focused image.

The direction of the opening of the slit 308 is perpendicular to the direction of deflection by the deflecting electrodes (described later). Only the part of the electron image defined by the opening of the slit 308 is applied to a streak focus electrode 309; that is, a slit electron image is applied to the streak focus electrode 309 so that it may be focused. The focused slit electron image is applied through a streak aperture 310 to the deflecting or sweeping space defined by the deflecting electrodes 311.

A deflecting voltage synchronous with the incidence of a light beam to be measured is applied to the deflecting electrodes 311 by a synchronous scanning circuit 7 so that the electron beam is caused to scan downwardly. The electrode 309, aperture 310, electrodes 311, and scanning circuit 7 comprises second focusing means for focusing the slit images on selected locations of the fluorescent surface.

Operating voltages, obtained by dividing the voltage of a power source 21 with a voltage divider 20, are applied to various circuit points of the streak tube 3.

An image-to-be-measured source 1 (hereinafter referred to as "an image source 1", when applicable) emits fluorescent light when excited by a pulse light beam from a light source 101. The light source 101 emits the pulse light beam in synchronization with the output drive pulse of a control circuit 100.

The shift voltage of the shift voltage generator 8 and the deflecting voltage for sweeping are synchronous with the emission of the pulse light beam by the light source 101.

The fundamental operation of the aforementioned streak tube will be described with reference to FIG. 3.

When the light source 101 is driven by a drive pulse (part (A) of FIG. 3) provided by a control circuit 100, the image source 1 is excited, as a result of which the image source 1 emits light whenever excited as shown in part (B) of FIG. 3.

The optical image of the image source 1 is applied through the lens 2 to the photocathode 302 of the streak tube 3, so that it is converted into a photoelectron image.

In synchronization with the aforementioned drive pulse, the shift voltage generator 8 applies the shift voltage as shown in part (C) of FIG. 3 to the shift electrodes 306 of the streak tube 3. A voltage as shown in part (D) of FIG. 3 is applied to the deflecting electrodes 311.

At the time that the first drive pulse (1), causes the production of an electron image by the photocathode 302 the first shift voltage shown in part (C) of FIG. 3 shifts the image such that region indicated at (1) in part (E) of FIG. 3 such that the region 1 passes through the slit 310, and is deflected by the deflecting voltage. As a result, a streak image of region (1) appears on the fluorescent surface 313.

The shift voltage, as shown in the part (C) of FIG. 3, is stepped and the time interval is changed stepwise in synchronization with the drive pulse of the whole system and the light emission from the object.

In the same manner as described in the case of region (1) of the image, the second drive pulse (2) causes the electron image corresponding to the region indicated at (2) in part (E) of FIG. 3 to be emitted by the slit 310 after shifting by the next shift voltage in part (C) of FIG. 3. The electric image of region (2) is deflected by the deflecting voltage and a streak image thereof appears on the fluorescent surface 313. The successive generation of streak images of the regions of the image source 1 are sequentially recorded.

Figure 4:
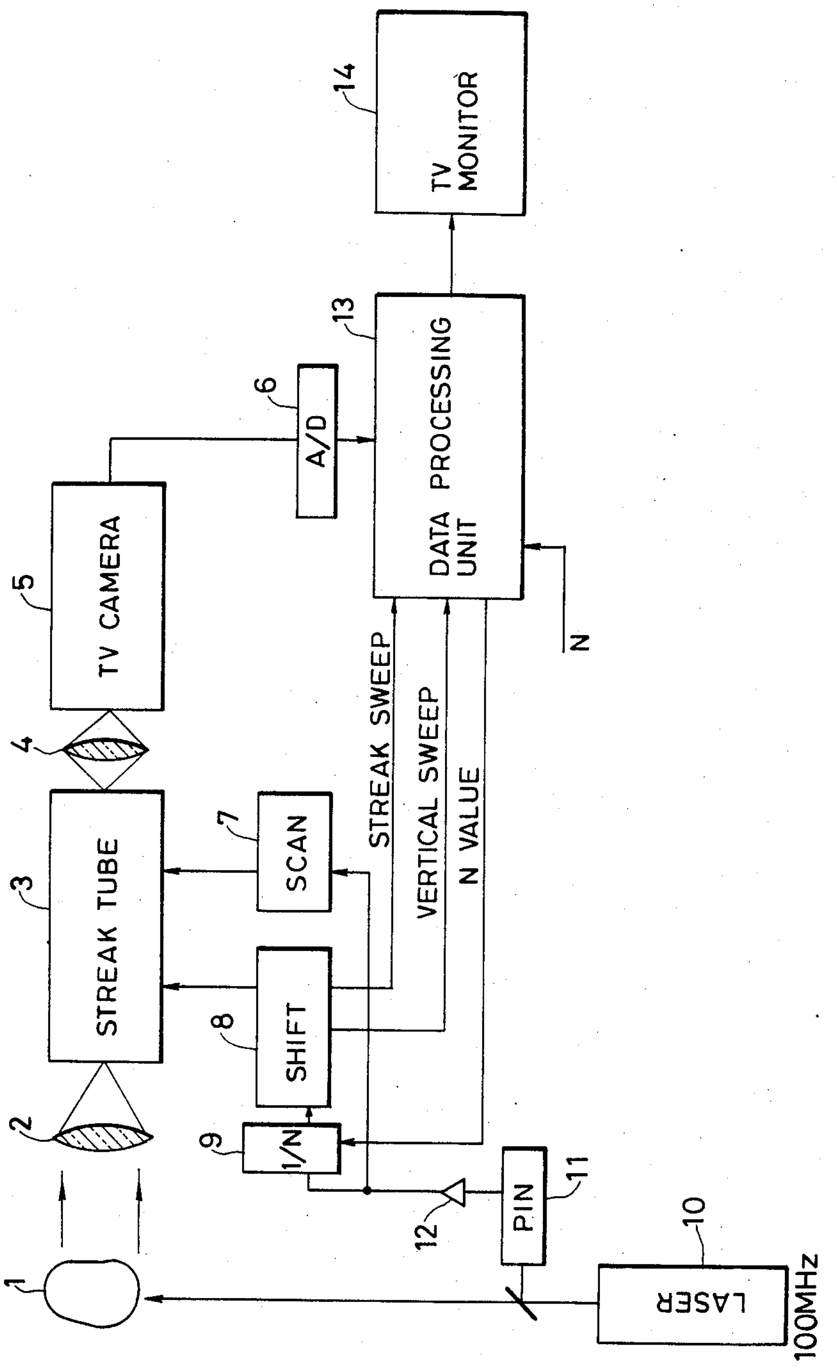
FIG. 4 is a block diagram of an application of the streak tube device of FIG. 1.

FIG. 4 is a block diagram showing a first application of the above-described streak tube of the present invention. In the first application, the sweep signal voltage generator 7 of the streak tube 3 is operated in a synchronous scanning method, and the image source 1 is illuminated with a mode rocked laser 10, so that the fluorescent image thereof may be measured in two dimensions.

The laser beam outputted by the laser 10 is applied to the image source 1. A part of the laser beam is applied through a pin photo-diode 11, an amplifier 12, the synchronous scanning section 7, and a 1/N frequency divider 9 to the shift voltage generator 8.

For instance in the case of N=100, the shift voltage outputted by the shift voltage generator 8 is maintained unchanged for the period of time that the mode rocked laser 10 provides one hundred (100) laser pulses. For that period of time, a part of the fluorescent image of the image source 1, namely, a slit image is outputted while being integrated on the fluorescent surface. The value N of the 1/N frequency divider 9 can be determined by observing the output image with a data processing unit 13.

The fluorescent image of the image source 1 is formed on the photocathode of the streak tube by the optical system 2, as a result of which the electron image thereof is produced. Similarly, as in the above-described case, the electron image is slit into linear parts by successively changing the shift voltage of the shift voltage generator 8.

The streak images formed by the linear parts are converted into television signals by the television camera 5, and the television signals are converted into digital signals which are successively stored in the memory of the data processing unit 13. The time displacement of the two-dimensional picture is displayed on an output unit, namely, a television monitor 14.

The two-dimensional space of the data memory in the data processing unit 13 is adapted to store a matrix of 512×512 picture elements. Therefore, in the analysts of each streak image, one slit of data for analysis is obtained by dividing the input picture by a factor of 512. If the operation is carried out for the whole picture, then it takes about 17 seconds (=1/30 sec×512 (lines)) because one streak data analysis time is 1/30 sec. This time limitation is due to the operational limit of the current data processing unit, not that of the device of the present invention.

Figure 5:
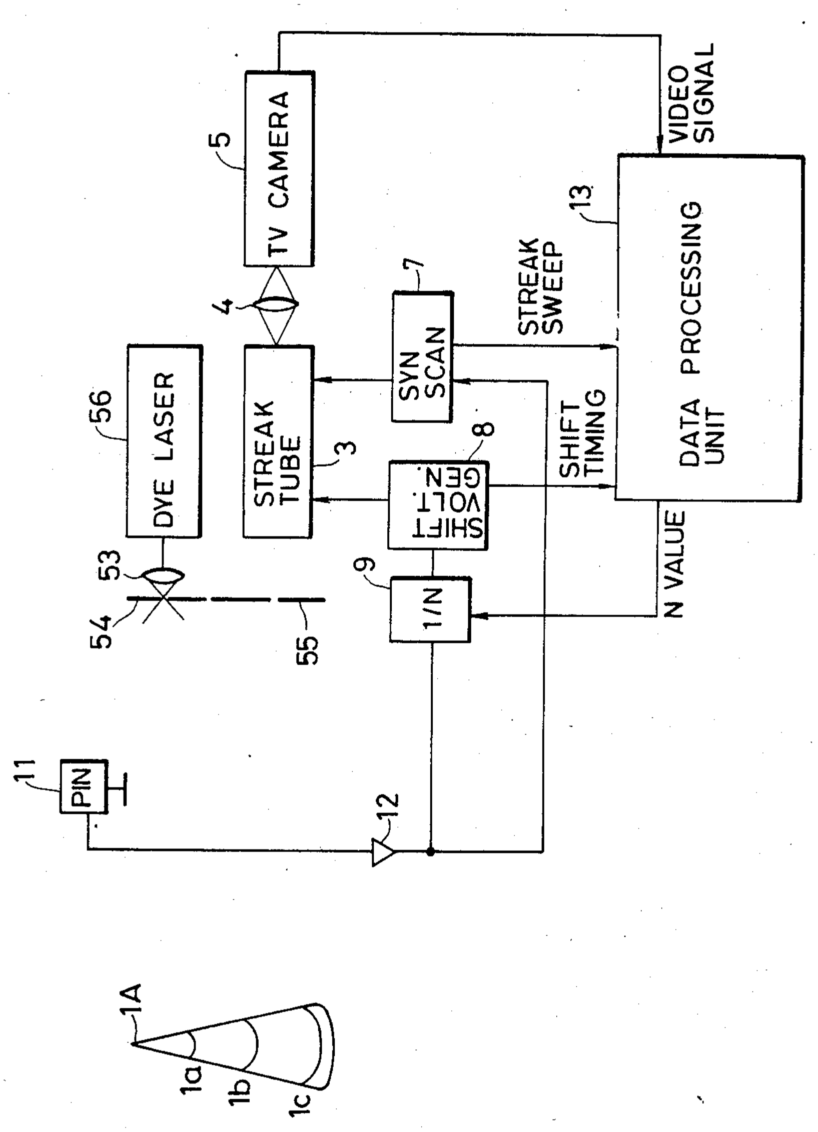
FIG. 5 is a block diagram showing a second application of the streak tube device of FIG. 1.
Figure 7:
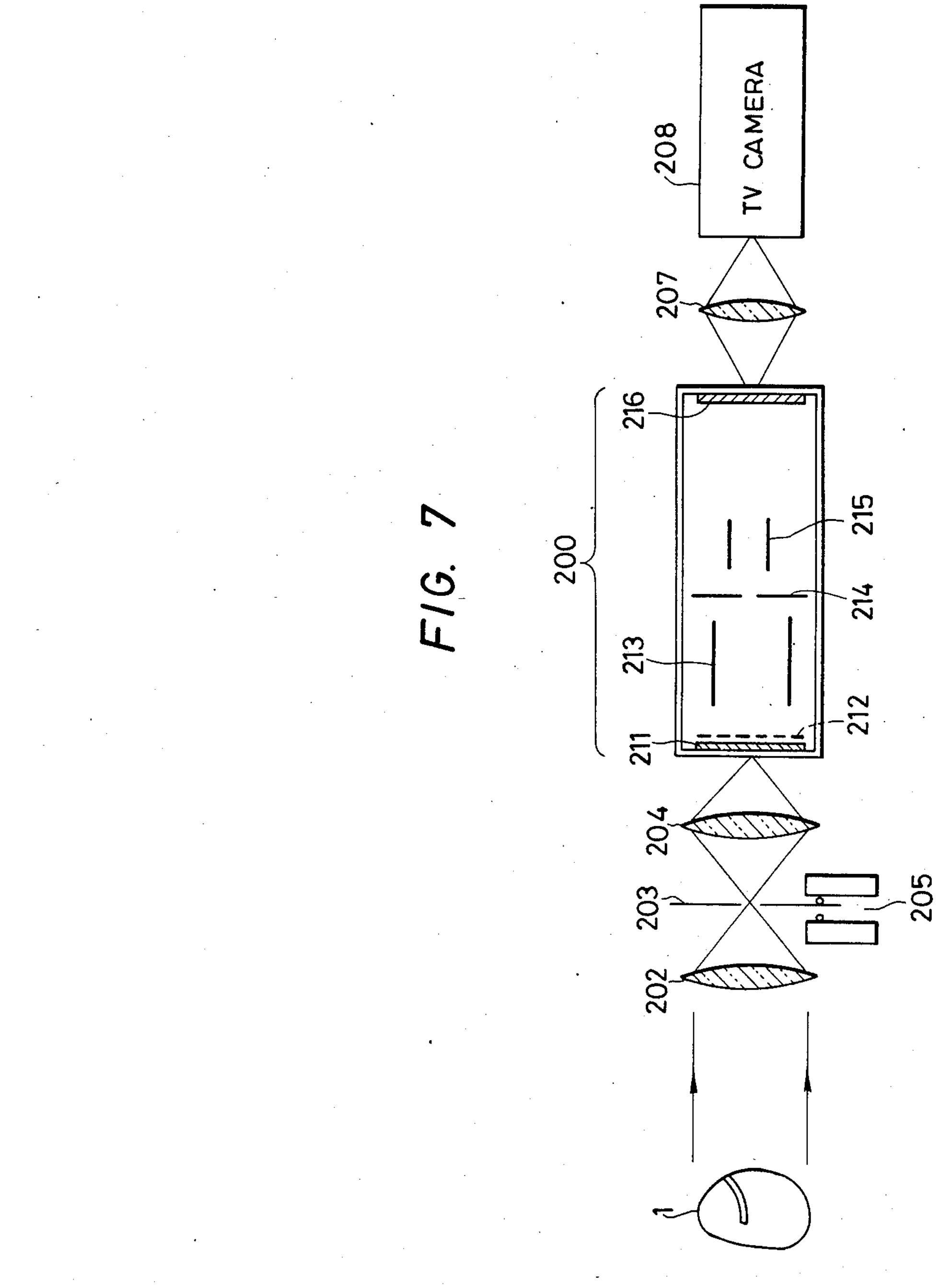
FIG. 7 is a diagram of a conventional streak tube device.

FIG. 5 is a block diagram showing a second application of the streak tube according to the present invention. In the application, three-dimensional measurement of a solid body or the like is carried out by utilizing the delay data on the wave surface of a light reflection wave. A pulse light beam from a dye laser 56, which is an ultra-short pulse laser beam source, is converted into a spherical wave by special optical systems 53 and 54. The spherical wave is applied to an object 1A under measurement, the object 1A being conical for convenience is description.

Figures 6A, 6B, 6C:
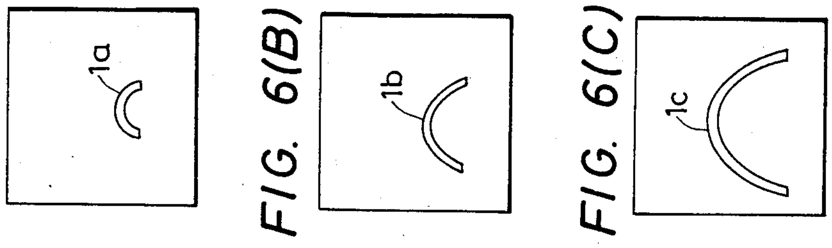
FIGS. 6A-6C are a diagram showing streak images obtained in the application of FIG. 5.

The streak tube 3 slits the reflection image of the object 1A into parts that correspond to parts 1*a*, 1*b*, and 1*c* of the object 1A, so that the streak images thereof are obtained. The streak images of the parts 1*a*, 1*b*, and 1*c* are as shown in FIG. 6. The curvature of each streak image corresponds to that of the respective part of the conical object 1A. The three-dimensional image of the object 1A can be reconstructed by using the streak images.

In the application, considerably small time difference must be utilized to produce streak images with high accuracy, and, therefore, the streak tube 3 has a high time resolution.

As is disclosed by Japanese Laid-Open Patent Application No. 147020/1982 filed by the present assignee, if the streak tube is so designed that the distance between the photocathode 302 and the mesh electrode 303 is a maximum at the center and smaller towards the periphery, electrons produced by photo-electric conversion at a number of points on the photocathode can be made equal in travel time. While one embodiment and several applications of the present invention have been described, it will be obvious to those skilled in the art that various modifications and changes can be made therein without departing from the scope and spirit of the present invention. For example, if it is necessary to increase the contrast of the image, a micro channel plate may be disposed before the fluorescent surface.

What is claimed is:

1. A streak tube device for electrically slitting the image of an object which is provided by an optical system, the device comprising:

a streak tube body having a first end and a second end;

photoelectric conversion means at said first end for receiving the image of the object and producing a corresponding electron image;

a fluorescent surface at said second end;

a first focusing means for producing a first focused image of said electron image comprising:

a mesh electrode for accelerating said electron image;

a front stage focus electrode for focusing said accelerated electron image; and a front stage aperture for transmitting said focused electron image;

electrical slitting means for transmitting a slit image corresponding to only a selected portion of said first focused image comprising:

a slit member having a slit extending across said streak tube body;

a first shift electrode and a second shift electrode for vertically shifting said transmitted electron image, said electron image passing between said first shift electrode and said second shift electrode;

a circular collimator electrode having said shifted electron image passing therethrough, said collimator electrode for collimating said shifted electron image and transmitting said collimated electron image through said slit to form an electron slit image;

slitting control means for electrically controlling the selection of said portion of said first focused image to be transmitted as said slit image such that the entire electron image is transmitted by a plurality of successive slit images; and second focusing means for focusing said slit images on selected locations of said fluorescent surface.

2. A streak tube device according to claim 1, wherein said slitting control means comprises a shift voltage generator for supplied deflecting voltages to said first shift electrode and said second shift electrode in synchronism with the provision of the image of the object.

3. A streak tube device according to claim 2, wherein said second focusing means comprises:

a streak focus electrode for focusing said electron slit image transmitted through said slit;

a streak aperture for transmitting said focused electron slit image;

a first deflecting electrode and a second deflecting electrode, said focused slit image passing between said first deflecting electrode and said second deflecting electrode; and a scanning circuit for suppling deflecting voltages to said first deflecting electrode and said second deflecting electrode such that said focused slit image passing therebetween is transmitted to a selected location on said fluorescent surface.

4. A streak tube device having a photocathode for emitting electrons composing an electron image of an optical image, an accelerating mesh electrode for accelerating the electrons of the electron image, a focusing electrode system for focusing electrons, a fluorescent surface, and deflecting electrodes for deflecting the electrons to impinge upon a selected location on the fluorescent surface, the improvement comprising electrical image slitting means including:

a front stage focusing electrode arrangement for receiving and focusing said electrons accelerated by the mesh electrode;

a shift electrode arrangement for shifting said focused electrons in a direction corresponding to the deflection by the deflecting electrodes;

a collimator electrode for collimating said shifted electrodes; and a slit member including a slit extending linearly in a direction perpendicular to the direction of deflection of the electrons by the deflecting electrodes, said slit for emitting a slit image comprising said collimated electrons to the focusing electrode system.

* * * * *